United States Patent
Lee et al.

(10) Patent No.: US 9,373,843 B2
(45) Date of Patent: Jun. 21, 2016

(54) BINDER FOR ELECTRODE OF LITHIUM BATTERY AND LITHIUM BATTERY CONTAINING THE BINDER

(75) Inventors: Beom-Wook Lee, Yongin-si (KR); Hye-Sun Jeong, Yongin-si (KR); Hye-Ran Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 584 days.

(21) Appl. No.: 13/598,523

(22) Filed: Aug. 29, 2012

(65) Prior Publication Data

US 2013/0177807 A1    Jul. 11, 2013

Related U.S. Application Data

(60) Provisional application No. 61/585,107, filed on Jan. 10, 2012.

(51) Int. Cl.
*H01M 4/62* (2006.01)
*H01M 10/052* (2010.01)
*H01M 4/134* (2010.01)
*H01M 4/1395* (2010.01)

(52) U.S. Cl.
CPC ............ *H01M 4/621* (2013.01); *H01M 10/052* (2013.01); *H01M 4/134* (2013.01); *H01M 4/1395* (2013.01); *Y02E 60/122* (2013.01)

(58) Field of Classification Search
CPC . H01M 10/052; H01M 4/134; H01M 4/1395; H01M 4/621; Y02E 60/122
See application file for complete search history.

(56) References Cited

U.S. PATENT DOCUMENTS

| 7,189,476 | B1 | 3/2007 | Macklin et al. | |
| 2004/0022719 | A1* | 2/2004 | Beguin et al. | 423/447.3 |
| 2007/0202403 | A1 | 8/2007 | Oh et al. | |
| 2011/0294013 | A1 | 12/2011 | Bosnyak et al. | |
| 2012/0183770 | A1* | 7/2012 | Bosnyak | B82Y 30/00 428/367 |

FOREIGN PATENT DOCUMENTS

| KR | 2002-0042646 A | 6/2002 |
| KR | 10-2007-0027438 A | 3/2007 |
| KR | 1020080071387 A | 8/2008 |
| KR | 1020090017939 A | 2/2009 |

OTHER PUBLICATIONS

Extended European Search Report dated Mar. 18, 2013, issued in connection with corresponding European Patent Application No. 12162647.7.
Liu, P., et al, Modifications of Carbon Nanotubes With Polymers, European Polymer Journal 41(11):2693-2703, Nov. 1, 2005.
Office Action dated Oct. 5, 2015 issued in corresponding European Application No. 12 162 647.7.

(Continued)

*Primary Examiner* — Carlos Barcena
(74) *Attorney, Agent, or Firm* — Knobbe Martens Olson & Bear LLP

(57) ABSTRACT

A binder for an electrode of a lithium battery, and a lithium battery containing the binder. The binder includes: a carbon nanotube; and a polymer chemically bonded to the carbon nanotube, and thus may form a conducting path by improving dispersion of the carbon nanotube. Accordingly, the binder may have high capacity and improve the lifetime of the lithium battery.

14 Claims, 1 Drawing Sheet

(56) References Cited

OTHER PUBLICATIONS

Lin Y et al.: "Polymeric Carbon Nanocomposites from Carbon Nanotubes functionalized with Matrix Polymer", Macromolecules, American Chemical Society, US, vol. 36, Sep. 23, 2005. pp. 7199-7204.

Spitalsky Z et al.: "Carbon nanotubes polymer composites: Chemistry, processing, mechanical and electrical properties", Progress in Polymer Science, Pergamon Press, Oxford, GB, vol. 35, No. 3, Mar. 1, 2010. pp. 357-401.

Liangwei Qu et al.: "Polyimide-Functionalized Carbon Nanotubes: Synthesis and Dispersion in Nanocomposite Films", Macromolecules, vol. 37, No. 16, Aug. 1, 2004. pp. 6055-6060.

Office Action mailed Jan. 22, 2016, issued in corresponding CN Application No. 201310007927.3.

* cited by examiner

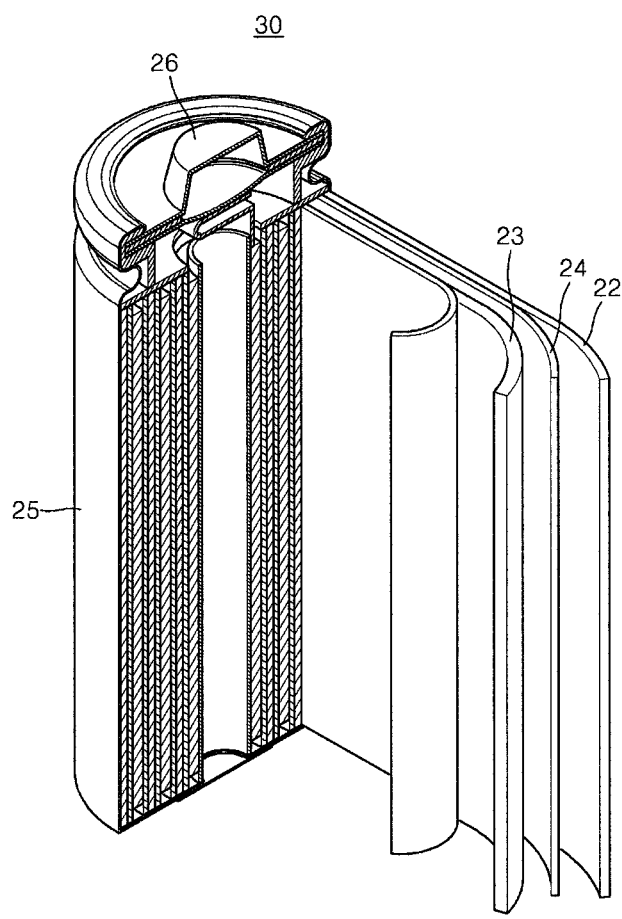

BINDER FOR ELECTRODE OF LITHIUM BATTERY AND LITHIUM BATTERY CONTAINING THE BINDER

CROSS-REFERENCE TO RELATED APPLICATIONS

This application claims priority to and the benefit of Provisional Patent Application No. 61/585,107 filed in the U.S. Patent and Trademark Office on Jan. 10, 2012, the entire contents of which are incorporated herein by reference.

BACKGROUND

1. Field

One or more embodiments relate to a binder for an electrode of a lithium battery, and a lithium battery containing the binder.

2. Description of the Related Technology

Lithium secondary batteries used in portable electronic devices for information communication, such as personal digital assistants (PDAs), mobile phones, and laptops, electric bicycles, and electric cars show at least a double discharge voltage compared to other batteries, and thus may show high energy density.

A lithium secondary battery includes an organic electrolyte solution or polymer electrolyte solution charged between a positive electrode and a negative electrode, which include an active material capable of intercalation and deintercalation of lithium ions, and generates electric energy according to oxidation and reduction reactions during intercalation/deintercalation of lithium ions in the positive electrode and negative electrode.

A positive electrode active material of a lithium secondary battery may be an oxide comprising lithium and a transition metal and having a structure capable of intercalation of lithium ions, such as lithium cobalt oxide ($LiCoO_2$), lithium nickel oxide ($LiNiO_2$), and lithium nickel cobalt manganese oxide ($Li[NiCoMn]O_2$ or $Li[Ni_{1-x-y}Co_xM_y]O_2$).

Carbon-based materials of various shapes including artificial or natural graphite or hard carbon, and non carbon-based materials, such as Si, which are capable of intercalation/deintercalation of lithium, are being studied as a negative electrode active material.

The non carbon-based materials may have very high capacity since capacity density to graphite is 10 times or above, but it is difficult to realize desired capacity with the non carbon-based materials due to very high volume expansion and contraction while charging and discharging lithium compared to the carbon-based materials.

Accordingly, studies are actively performed to improve characteristics of not only the high capacity materials, but also each element forming a lithium battery, such as a positive electrode active material, an electrolyte, a separator, and a binder.

SUMMARY

One or more embodiments include a binder for an electrode of a lithium battery capable of improving a lifetime characteristic of the lithium battery.

One or more embodiments include a lithium battery containing the binder.

According to one or more embodiments, a binder for an electrode of a lithium battery, the binder includes: a carbon nanotube; and a polymer chemically bonded to the carbon nanotube.

According to one or more embodiments, a lithium battery includes: a negative electrode; a positive electrode facing the negative electrode; and an electrolyte disposed between the negative electrode and the positive electrode, wherein at least one of the negative electrode and the positive electrode includes the binder. According to one or more embodiments, a binder for an electrode of a secondary lithium battery, wherein the binder comprises: a carbon nanotube; and a polymer bonded to the carbon nanotube by a chemical bond. In some embodiments, the chemical bond is an ionic bond or a covalent bond. Additionally, in some embodiments, the covalent bond comprises at least one of an ester group, an amide group and a carbonate anhydride group. In some embodiments, the ionic bond comprises a carboxylate ion and an ammonium ion. In some embodiments, the polymer is bonded to the carbon nanotube by a chemical bond. In some embodiments, the chemical bond is an ionic bond or a covalent bond. Further, in some embodiments, the covalent bond comprises at least one of an ester group, an amide group and a carbonate anhydride group and in some embodiments, the ionic bond comprises a carboxylate ion and an ammonium ion.

Some embodiments relate to a method of making a binder comprising a carbon nanotube and a polymer bonded to the carbon nanotube by a chemical bond for a secondary lithium battery, the method comprising: adding a carbon nanotube having a functional group to a polymer or a polymerizable material to form a mixture, stirring and heating the mixture to form the binder. In some embodiments, the functional group is a carboxyl group, a hydroxyl group, an acyl chloride group or an amine group and in some embodiments, the functional group of the carbon nanotube is a carboxyl group which is modified to an acyl chloride group or an amine group before adding the carbon nanotube to the polymer or the polymerizable material.

A binder for an electrode of a lithium battery can improve a conducting path with a low amount by improving dispersion of a carbon nanotube, and improve a lifetime of the lithium battery.

BRIEF DESCRIPTION OF THE DRAWINGS

FIG. 1 is a schematic view of a structure of a lithium battery according to one embodiment.

DETAILED DESCRIPTION

Hereinafter, one or more embodiments will be described in detail.

A binder for an electrode of a lithium battery, according to an embodiment includes: a carbon nanotube; and a polymer bonded to the carbon nanotube by a chemical bond.

The binder may be used for an electrode of a lithium battery using a negative electrode active material capable of realizing high capacity; such as a silicon-based active material, a tin-based active material, or a silicon-carbon-based active material. The binder improves dispersion of the carbon nanotube since the binder is chemically bonded to the carbon nanotube, has high capacity since a conducting path is formed with a low amount, does not agglomerate due to movement of the carbon nanotube during expansion and contraction of an active material due to charging and discharging while driving the lithium battery, and improves a lifetime of the lithium battery since the conducting path is maintained according to increase of tensile strength of the binder due to the carbon nanotube.

Carbon nanotubes not only have excellent mechanical strength, thermal conductivity, and chemical stability, but also have similar electric conductivity as copper, and thus are suitable as a conductive filler. The carbon nanotube used in the binder may be any type of carbon nanotube, such as a single walled carbon nanotube, a double-walled carbon nanotube, a multi-walled carbon nanotube, a bunch type carbon nanotube, or a mixed type thereof. The carbon nanotube may be manufactured by using a general manufacturing method, such as an arc discharge method, a laser ablation method, a chemical vapor deposition method, or a high pressure carbon monoxide separation (HIPCO) method. A diameter of the carbon nanotube may be from several to tens of nm, and a length of the carbon nanotube may be from several to hundreds of μm. For example, the diameter of the carbon nanotube may be from about 5 to about 50 nm, and the length of the carbon nanotube may be from about 10 to about 50 μm.

An amount of the carbon nanotube may be from about 1 to about 30 parts by weight based on 100 parts by weight of polymer, for example, from about 5 to about 20 parts by weight.

The binder may be an aqueous binder that dissolves in water or an organic binder that dissolves in an organic solvent. Here, the aqueous binder is environmental friendly, and characteristics, such as adhesive strength, tensile strength, and elasticity, of the organic binder can be variously realized. Accordingly, the polymer is not limited as long as such an aqueous or organic binder is realized. However, a binder that does not dissolve in water or an organic solvent should not be used.

The molecular weight of the polymer is not limited as long as the polymer includes a functional group, such as a hydroxyl group, a carboxyl group, or an amine group, that forms a chemical bond with a preprocessed carbon nanotube, and is compatible with an active material included in an electrode composition and other additives to form a slurry. Also, the polymer must have electrochemically stable characteristics while charging and discharging a lithium battery.

Examples of the polymer include polyamic acid, polyvinyl alcohol (PVA), carboxy methyl cellulose (CMC), starch, hydroxypropyl cellulose, regenerated cellulose, phenol-resin, epoxy resin, polyimide (PI), polyamide imide (PAI), polyacrylic acid, polymethacrylic acid, copolymers thereof, modified resins thereof, and condensation polymers thereof with other components. The polymer may be used in a single type or by mixing at least two types.

The carbon nanotube and the polymer are chemically bonded, meaning that the carbon nanotube and the polymer are bonded via ionic bond or a covalent bond.

The binder is not formed by simply mixing the carbon nanotube and the polymer, but by chemically bonding the carbon nanotube and the polymer so that the carbon nanotube does not agglomerate and is satisfactorily dispersed.

According to embodiments of the present invention, the carbon nanotube and the polymer are chemically bonded, via an ionic bond or a covalent bond.

Depending on the functional groups selected for the polymer material and the preprocessed carbon nanotube, the resulting covalent bond may be at least one of an ester group, an amide group and a carbonate anhydride group.

The ionic bond may comprise a carboxylate ion and an ammonium ion. Here, the ammonium ion refers to $RNH_3^+$ (R is a hydrogen or comprises any one of akyl, alkenyl, and alkynyl groups having C1-C20).

A following method may be used to form the chemical bond.

For example, in order to chemically bond with the polymer, a preprocess is performed on the carbon nanotube to introduce a functional group, such as a carboxyl group (—COOH), a hydroxyl group (—OH), or an amine group (—$NH_2$), or an acylchloride group (COCl), on the surface of the carbon nanotube. For example, a functional group, such as a carboxyl group (—COOH), may be introduced to the surface of the carbon nanotube via wet etching using strong acid or the like, or dry etching using plasma or vacuum ultraviolet rays, and the chemical bond is induced via chemical reaction by mixing the carbon nanotube introduced with the functional group with a polymerable material (for example, monomer, olygomer, low molecular weight polymer), or synthesized polymer. In order to easily induce the chemical bond according to types of polymer, the carbon nanotube introduced with the carboxyl group may be modified via an additional process, such as an acid treatment, and chemically bonded to the polymer.

There are largely two methods of chemically bonding the carbon nanotube and the polymer. A first method is a method of forming a polymer via polymerization after chemically bonding a preprocessed carbon nanotube to monomer or olygomer that is capable of generating polymerization, and a second method is a method of directly chemically reacting a preprocessed carbon nanotube with synthesized polymer. The first method is capable of manufacturing various binders, and the second method includes relatively simple manufacturing operations. According to an embodiment, the carbon nanotube and the polymer are chemically bonded by using the second method.

If a preprocessed carbon nanotube is simply mixed with polymer to be used as a binder, it is difficult to induce a chemical bond between the preprocessed carbon nanotube and the polymer while manufacturing an electrode. Even if a physical bond is induced, the binding force is weaker compared to a chemical bond, and thus the carbon nanotube may agglomerate. Also, if a binder is formed by simply mixing a carbon nanotube and polymer, battery characteristics may not improve.

As such, by forming the binder by chemically bonding the carbon nanotube and the polymer, a conducting path is formed by improving dispersion of the carbon nanotube, and as a result, the amount of the active material is increased, thereby realizing high capacity. Also, the conducting path is maintained without agglomeration of the carbon nanotube even during expansion and contraction of the active material due to charging and discharging while driving the lithium battery, and thus the lifetime characteristic of the lithium battery may be improved.

A lithium battery according to an embodiment includes: a negative electrode, a positive electrode facing the negative electrode; and an electrolyte disposed between the negative electrode and the positive electrode, wherein at least one of the negative electrode and the positive electrode include the binder.

According to an embodiment, the negative electrode may include the binder described above.

The negative electrode includes a negative electrode active material, and may be manufactured by manufacturing a negative electrode active material composition including a negative electrode active material, a binder, selectively a conducting agent, and a solvent, and then molding the negative electrode active material composition to a certain shape or by coating the negative electrode active material composition on a current collector, such as copper foil.

The negative electrode active material is not specifically limited to general negative electrode active materials used in the related field. Examples of the negative electrode active material unlimitedly include a lithium metal, a metal alloyable with lithium, a transition metal oxide, a material capable of doping and undoping lithium, a material capable of reversible intercalation and deintercalation of lithium ions, and mixtures of combined forms thereof.

Examples of the transition metal oxide include without limit tungsten oxide, molybdenum oxide, titanium oxide, lithium titanium oxide, vanadium oxide, lithium vanadium oxide and the like.

The material capable of doping and undoping lithium may be Si, $SiO_x$ ($0<x\leq2$), Si—Y alloy (Y is an alkali metal, an alkali earth metal, a group 13 element, a group 14 element, a transition metal, a rare earth element, or a combined element thereof, and is not Si), Sn, $SnO_2$, or an Sn—Y alloy (Y is an alkali metal, an alkali earth metal, a group 13 element, a group 14 element, a transition element, a rare earth element, or a combined element thereof, and is not Sn). At least one thereof may be used while being mixed with $SiO_2$. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material capable of reversible intercalation and deintercalation of lithium ions is a carbon-based material, and is not limited as long as it is used for a general carbon-based negative electrode active material used in a lithium battery. For example, the material may be crystalline carbon, amorphous carbon, or a mixture thereof. Examples of the crystalline carbon unlimitedly include amorphous, plate, flake, circular, or fiber natural graphite, or artificial graphite. Examples of the amorphous carbon include without limit soft carbon (low temperature sintered carbon), hard carbon, mesophase pitch carbide, sintered cokes and the like.

According to an embodiment, the negative electrode active material may be a silicon-based active material, such as Si, $SiO_x$ ($0<x\leq2$), or an Si—Y alloy, a tin-based active material, such as Sn, $SnO_2$, or an Sn—Y alloy, a silicon-tin alloy-based active material, or a silicon-carbon-based active material, which realizes high capacity.

The binder used for the negative electrode active material composition helps combination of the negative electrode active material and the conducting agent, and combination of the current collector, and may be the binder formed by chemically bonding the carbon nanotube and the polymer as described above. Accordingly, volume expansion of the negative electrode active material generated while charging and discharging the lithium battery may be suppressed. The amount of binder may be about 1 to about 20 parts by weight, for example, about 2 to about 10 parts by weight based on 100 parts by weight of the negative electrode active material.

Only the binder formed by chemically bonding the carbon nanotube and the polymer should be used as the negative electrode active material composition, or at least two types of the binders may be mixed to compensate for characteristics, such as adhesive strength, tensile strength, and elasticity with the current collector and the negative electrode active material. Alternatively, a general binder that does not include the binder and the carbon nanotube may be mixed to improve characteristics. The general binder is not specifically limited as long as it is compatible with the binder, the negative electrode active material, and other additives, and has electrochemically sable characteristics during charging and discharging processes. For example, the negative electrode active material composition may be a mixture of polyfluorovinylidene, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene ter polymer (EPDM), sulfonated EPDM, styrene butadiene rubber, fluorine rubber, and other various copolymers.

In order to improve electric conductivity, the negative electrode may selectively further include a conducting agent. Any conducting agent generally used for a lithium battery may be used, and examples of the conducting agent include carbon-based materials such as carbon black, acetylene black, ketchen black, and carbon fiber (such as vapor growth carbon fiber); metal-based materials such as metal powder and metal fiber like copper, nickel, aluminum, and silver; conductive polymers such as polyphenylene derivatives, and mixtures thereof. Amounts of the conducting agents may be suitably adjusted.

The solvent may be N-methylpyrrolidone (NMP), acetone, or water. The amount of solvent may be about 10 to about 300 parts by weight based on 100 parts by weight of the negative electrode active material. An active material layer is easily formed if the amount of the solvent is within the above range.

The negative electrode active material composition may include other additives, such as an adhesive strength improver such as silane coupling agent for improving adhesive strength with the current collector and the active material, and a dispersant for improving dispersion of a slurry.

Also, a thickness of the current collector is generally from about 3 to about 100 μm. The current collector is not limited as long as it is conductive while not inducing a chemical change to the lithium battery, and examples of the current collector include copper, stainless steel, aluminum, nickel, titanium, sintered carbon, copper or stainless steel having a surface processed by carbon, nickel, titanium, or silver, an aluminum-cadmium alloy, and the like. Alternatively, binding force of the negative electrode active material may be strengthened by forming a minute unevenness on the surface of the current collector, and the current collector may have any one of various shapes, such as a film, a sheet, a foil, a net, a porous shape, an expanded shape, and a non woven shape.

A negative electrode plate may be manufactured by directly coating the manufactured negative electrode active material composition on the current collector or by casting the negative electrode active material composition on a separate support and laminating a negative electrode active material film separated from the support on a copper foil current collector. A form of the negative electrode is not limited to above, and may vary.

In order to manufacture a positive electrode, a positive electrode active material composition in which a positive electrode active material, a conducting agent, a binder, and a solvent are mixed is separately prepared.

The positive electrode active material is lithium containing metal oxide, and any positive electrode active material generally used in the related field may be used. For example, the positive electrode active material may be $LiCoO_2$, $LiMn_xO_{2x}$ (x=1, 2), $LiNi_{1-x}Mn_xO_2$ ($0<x<1$), or $LiNi_{1-x-y}Co_xMn_yO_2$ ($0\leq x\leq0.5$, $0\leq y\leq0.5$). For example, the positive electrode active material may be a compound capable of intercalation/deintercalation of lithium, such as $LiMn_2O_4$, $LiCoO_2$, $LiNiO_2$, $LiFeO_2$, $V_2O_5$, TiS, or MoS.

The conducting agent, the binder, and the solvent in the positive electrode active material composition may be identical to those in the negative electrode active material composition. According to cases, pores may be formed inside an electrode plate by further adding a plasticizer to the positive and negative electrode active material compositions.

Amounts of the positive electrode active material, the conducting agent, the binder, and the solvent are in levels generally used in a lithium battery.

A thickness of the current collector of the positive electrode is from about 3 to about 100 µm, and is not specifically limited as long as the current collector has high conductivity while not inducing a chemical change to the lithium battery. Examples of the current collector include stainless steel, aluminum, nickel, titanium, sintered carbon, or aluminum or stainless steel having a surface processed by carbon nickel, titanium, or silver. Alternatively, adhesive strength of the positive electrode active material may be increased by forming a minute unevenness on the surface of the current collector, and the current collector may have any one of various shapes, such as a film, a sheet, a foil, a net, a porous shape, an expanded shape, and a non woven shape.

The prepared positive electrode active material composition may be directly coated and dried on the current collector of the positive electrode to manufacture a positive electrode plate. Alternatively, the positive electrode active material composition may be casted on a separate support, and a film obtained by separating the positive electrode active material composition from the support may be laminated on the current collector to manufacture a positive electrode plate.

The positive electrode and the negative electrode may be separated by using a separator, and any separator generally used in a lithium battery may be used. Specifically, the separator may have low resistance to ionic migration of the electrolyte, while having excellent electrolyte solution containing capacity. For example, the separator may comprise a material selected from among glass fiber, polyester, Teflon, polyethylene, polypropylene, polytetrafluoroethylene (PTFE), and a composition thereof, and may be in a non-woven or woven shape. The separator may have a pore diameter of about 0.01 to about 10 µm and a thickness of about 3 to about 100 µm.

The nonaqueous electrolyte containing lithium includes nonaqueous electrolyte and lithium. Examples of the nonaqueous electrolyte include a nonaqueous electrolyte solution, a solid electrolyte, and inorganic solid electrolyte.

The nonaqueous electrolyte solution may be a non-protonic organic solvent, such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, formic acid methyl, acetic acidmethyl, phosphoric acid triester, trimethoxy methane, a dioxolane derivative, sulforane, methyl sulforane, 1,3-dimethyl-2-imidazolidinone, a propylene carbonate derivative, a tetrahydrofuran derivative, ether, propionate methyl, or propionate ethyl.

Examples of the organic solid electrode include polyethylene derivatives, polyethylene oxide derivatives, polypropylene oxide derivatives, phosphoric acid ester polymer, poly agitation lysine, polyester sulfide, polyvinyl alcohol, poly fluoride vinyllidene, and a polymer including an ionic dissociable group.

Examples of the inorganic solid electrolyte include Li nitrides, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, halogenide, and a sulfate.

Any lithium salt generally used in a lithium battery may be used, and may be at least one of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carbonic acid lithium, 4 phenyl boric acid lithium, and imide, which are easily dissolved in the nonaqueous electrolyte.

The lithium battery may be classified into a lithium ion battery, a lithium ion polymer battery, and a lithium polymer battery according to types of the separator and electrolyte, may be classified into a circular type, an angular type, a coin type, a pouch type according to shapes, and may be classified into a bulk type and a thin film type according to sizes. Also, the lithium battery may be a lithium primary battery or a lithium secondary battery.

A method of manufacturing the lithium battery is well known, so details thereof are not described herein.

A method of preparing a binder for an electrode active material of a lithium battery, comprises, according to an embodiment of the present invention, the steps of adding a carbon nanotube having an organic functional group to a polymer material or a polymerizable material and stirring the mixture to obtain a polymer material or polymerizable material chemically bonded to the carbon nanotube and, optionally, polymerizing the polymerizable material.

A covalent bond may be formed between the carbon nanotube and the polymer material or polymerizable material in the presence of a catalyst.

The stirring step may be performed at a temperature ranging from 60° C. to 90° C. It may also be performed for 24 hours.

The functional group of the carbon nanotube may be introduced in a preprocessing step of the carbon nanotube comprising an etching step, in particular a wet etching using a strong acid, or a dry etching using plasma or vacuum ultraviolet rays.

The functional group of the carbon nanotube may be a carboxyl group which is modified to an acyl chloride group or an amine group before adding it to the polymer material or to the polymerized material.

When appropriate, all the featured defined above may, of course, be combined.

FIG. 1 is a schematic view of a structure of a lithium battery 30 according to an embodiment.

Referring to FIG. 1, the lithium battery 30 includes a positive electrode 23, a negative electrode 22, and a separator 24 disposed between the positive electrode 23 and the negative electrode 22. The positive electrode 23, the negative electrode, 22, and the separator 24 are wound or folded to be accommodated in a battery case 25. Then, an electrolyte is injected into the battery case 25, and the battery case 25 is sealed by a sealing member 26, thereby completing the lithium battery 30. The battery case 25 may have a circular, angular, or thin film shape. The lithium battery 30 may be a lithium ion battery.

The lithium battery 30 may be used for general mobile phones and mobile computers, as well as electric vehicles that need high capacity, high output, and high temperature operation. Further, the lithium battery 30 may be used in hybrid vehicles by being combined with an internal combustion engine, a fuel cell, and a super capacitor. Also, the lithium battery may be used for other purposes that require high output, high voltage, and high temperature operation.

Embodiments will be described in greater detail with reference to the following examples and comparative examples. The following examples are for illustrative purposes only and are not intended to limit the scope of the embodiments.

Preparation Example 1

Preparation of Preprocessed Carbon Nanotube (CNT) Composition (1) Introduction of Carboxyl Group Via Acid Treatment of CNT 2 g of multi-walled CNT having a diameter of about 10 to 20 nm and a length of about 10 to 50 µm was processed for 24 hours at 40° C. by using 300 ml of 20 wt % nitric acid solution. Then, 1 g of the cleaned CNT was immersed in 200 ml of solution in which strong sulfuric acid and strong nitric acid are mixed by 3:1 (v/v %), processed with ultrasonic waves for 3 hours at a room temperature, and then stirred for 6 hours at 70° C. Next, an acid solution on the CNT was cleanly removed via filtering and several cleaning using pure water, and then the result product was dried in a vacuum oven for 24 hours at 80° C. to prepare a CNT introduced with a carboxyl group (material A).

(2) Modification-(1) of CNT Introduced with Carboxyl Group

The carboxyl group on the surface of CNT was modified to an acyl chloride group by performing a following process on the material A.

1.0 g of the material A and 400 ml of thinoyl chloride diluted in anhydrous tetrahydrofuran (THF) by 5 wt % were mixed in a reaction container, and the mixture was processed with ultrasonic waves for 10 minutes and then refluxed for 12 hours while being stirred under a nitrogen atmosphere. Then, the result product was filtered and cleaned several times by using anhydrous THF to remove un-reacted thionyl chloride and other impurities, and then was dried for 12 hours at 80° C. in a vacuum oven to prepare CNT where the carboxyl group is changed to an acyl chloride (material B).

(3) Modification-(2) of CNT Introduced with Carboxyl Group

The surface of CNT was modified to an amine group by performing a following process on the material B.

0.5 g of the material B and 100 ml of hexamethyldiamine (HMDA) diluted in anhydrous THF by 1.0 wt % were mixed in a reaction container, and the mixture was processed with ultrasonic waves for 10 minutes and then refluxed for 12 hours while being stirred under a nitrogen atmosphere. The result product was filtered and cleaned several times by using anhydrous THF to remove un-reacted HMDA and other impurities, and then was dried for 12 hours at 60° C. in a vacuum oven to prepare CNT having an amine group (material C).

Preparation Example 2

Preparation of Aqueous Binder Composition 3 g of poly(vinyl alcohol) (PVA, saponification: about 87 to about 89%, average Mw: about 31,000 to about 50,000 g/mol), which was vacuum-dried for 24 hours at 110° C., and 27 g of anhydrous dimethyl acetamide (DMAc) were mixed in a reaction container, and stirred and heated for 6 hours at 100° C. under a nitrogen atmosphere so that PVA is completely dissolved in DMAc. Then, the temperature of the reaction container was decreased to a room temperature, and 0.2 g of calcium hydride (CaH2) was put in the reaction container, stirred for 24 hours to remove remaining moisture, and filtered to obtain a solution. 18 g of the solution and 0.2 g of the material B were put into the reaction container, processed with ultrasonic waves for 10 minutes, and then stirred for 1 hour. Then, 0.1 ml of refined triethyl amine was injected into the reaction container by using a syringe, and then the temperature of the reaction container was increased up to 60° C. and then the reaction container was stirred for 24 hours. After the reaction is completed, the solution in the reaction container was poured into 200 ml of ethyl alcohol solution to precipitate the reactant, and then an aqueous binder (material D) where CNT is covalently bonded to PVA was manufactured via filtering, cleaning, and drying processes. A chemical structure of the material D has a repeated unit as shown in Formula 1 below.

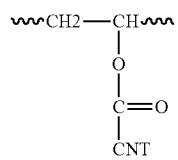

Formula 1

Then, 1 g of the material D and 19 g of pure water were put into the reaction container and then stirred for 24 hours at 70° C. to prepare an aqueous binder composition (solution E) that is used to prepare a slurry for a negative electrode of a lithium battery, which uses the material D.

Preparation Example 3

Preparation of Aqueous Binder Composition 0.9 g of poly(acrylic acid) (PAA, average Mw: about 450,000 g/mol), which was vacuum-dried for 24 hours at 110° C., and 19 g of pure water were mixed in a reaction container, and stirred and heated for 6 hours at 60° C. so that PAA is completely dissolved in pure water. Then, the temperature of the reaction container was decreased to a room temperature, 0.1 g of the material C was put into the reaction container, processed with ultrasonic waves for 10 minutes, and then stirred for 24 hours to prepare an aqueous binder composition (solution F) where CNT is ionic bonded to PAA. Here, a chemical structure of a binder contained in the solution F has a repeated unit as shown in Formula 2 below.

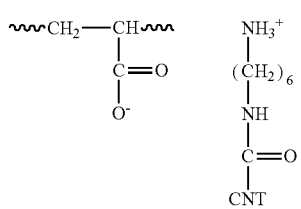

Formula 2

Preparation Example 4

Preparation of Organic Binder Composition 2 g of condensed polymer (average Mw: about 70,000 to about 100,000 g/mol) of polyimide (PI), 4,4'-oxydiphthalic anhydride (OPDA), and 2,2-bis(3-amino-4-hydroxy-phenyl)hexafluoropropane (BAPAF), which was vacuum-dried for 24 hours at 110° C., and 18 g of anhydrous dimethyl sulfoxide (DMSO) were mixed, and stirred and heated for 12 hours at 100° C. under a nitrogen atmosphere so that PI was completely dissolved in DMSO. Then, the temperature of the reaction container was reduced to 60° C., and 0.2 g of the material B prepared in (2 negative electrode active material slurry) of Preparation Example 1 was put into the reaction container, processed with ultrasonic waves for 10 minutes, and stirred for 1 hour. Then, 0.1 ml of refined triethyl amine was injected into the reaction container by using a syringe, and then the reaction container was stirred for 24 hours at 60° C. After the reaction is completed, the solution in the reaction container was poured into 200 ml of ethyl alcohol solution to precipitate the reactant, and then an organic binder (material G) where CNT is covalently bonded to PI was manufactured via filtering, cleaning, and drying processes. A chemical structure of the material G has a repeated unit as shown in Formula 3 below.

Formula 3

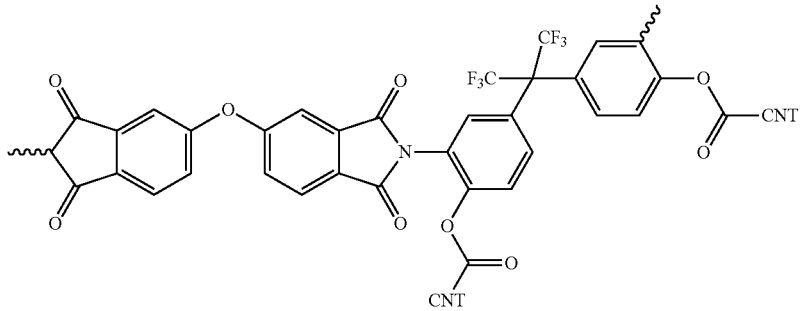

Then, 1 g of the material E and 19 g of NMP(N-methyl pyrrolidone) were put into the reaction container and then stirred for 24 hours at 70° C. to prepare an organic binder composition (solution H) that is used to prepare a slurry for a negative electrode of a lithium battery, which uses the material G.

Preparation Example 5

Preparation of Organic Binder Composition 2 g of urethane modified epoxy resin (hydroxyl equivalent: about 250 to about 300, average Mw: about 30,000 to about 50,000 g/mol), which was vacuum-dried for 24 hours at 110° C., and 18 g of anhydrous dimethyl sulfoxide (DMSO) were mixed in a reaction container, and stirred and heated for 3 hours at 100° C. under a nitrogen atmosphere so that urethane modified epoxy resin was completely dissolved in DMSO. Then, the temperature of the reaction container was reduced to 60° C., and 0.2 g of the material A prepared in (1 negative electrode active material slurry) of Preparation Example 1 was put into the reaction container, processed with ultrasonic waves for 10 minutes, and stirred for 1 hour. Then, 0.01 g of refined p-toluene sulfonic acid was injected into the reaction container, and then the reaction container was stirred for 24 hours at 90° C. After the reaction is completed, the solution in the reaction container was poured into 200 ml of diethyl ether solution to precipitate the reactant, and then an organic binder (material I) where CNT is covalently bonded to urethane modified epoxy resin was manufactured via filtering, cleaning, and drying processes. The material I has a chemical structure shown in Formula 4 below.

Formula 4

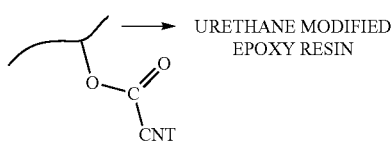

Then, 1 g of the material I and 19 g of NMP(N-methyl pyrrolidone) were put into the reaction container and then stirred for 24 hours at 70° C. to prepare an organic binder composition (solution J) that is used to prepare a slurry for a negative electrode of a lithium battery, which uses the material I.

Manufacture of Lithium Battery

Example 1

8 g of the aqueous binder composition (solution E) prepared in Preparation Example 2, 1.8 g of 5% PAA (average Mw: about 450,000 g/mol), and 0.01 g of water-soluble thermosetting accelerator were mixed and stirred for 3 hours at a room temperature to prepare a uniformly mixed solution. 9.5 g of powder where Si—Ti—Ni-based Si-alloy (average particle size: about 5 μm) and graphite are mixed at a weight ratio of 2:8 was added to the uniformly mixed solution and stirred for 1 hour to prepare a negative electrode active material slurry 1 where the powder is uniformly dispersed. A small amount of water was added to adjust viscosity of the negative electrode active material slurry 1.

The negative electrode active material slurry 1 was coated on a copper foil current collector having a thickness of 10 μm to prepare a negative electrode plate, and the coated negative electrode plate was first dried for 1 hour at 110° C., dried again in a vacuum oven for 2 hours at 150° C., pressed by using a press to prepare a negative electrode having a thickness of 60 μm. A compressed coin cell of 2016R type was prepared by using a Li metal as a counter electrode, by using a separator (product name: STAR20, Asahi) comprising polyethylene and having a thickness of 20 μm, and by injecting an electrolyte solution. Here, an electrolyte was prepared by dissolving $LiPF_6$ in a mixed solvent (1:1 volume ratio) of ethylene carbonate (EC) and diethyl carbonate (DEC) such that concentration of $LiPF_6$ is 1M.

Example 2

A coin cell was prepared in the same manner as in Example 1, except that a negative electrode active material slurry 2 was prepared by using 10 g of the aqueous binder composition (solution F) prepared in Preparation Example 3 instead of the aqueous binder composition (solution E), and the negative electrode active material slurry 2 was used to prepare a negative electrode.

Example 3

A negative electrode active material slurry 3 was prepared by mixing and stirring 10 g of the organic binder composition (solution H) prepared in Preparation Example 4 and 9.5 g of powder, where an Si—Ti—Ni-based Si-alloy (average particle diameter: about 5 μm) and graphite are mixed at a weight ratio of 2:8, for 1 hour such that the powder is uniformly dispersed. Here, a small amount of NMP was added to adjust viscosity of the negative electrode active material slurry 3.

A coin cell was prepared in the same manner as in Example 1, except that a negative electrode was prepared by using the negative electrode active material slurry 3.

Example 4

A uniformly mixed solution was prepared by mixing 7 g of the organic binder composition (solution H) prepared in Preparation Example 4 and 3 g of the organic binder composition (solution J) prepared in Preparation Example 5, and then stirring the mixture for 1 hour at a room temperature. 9.5 g of powder where an Si—Ti—Ni-based Si-alloy (average particle diameter: about 5 μm) and graphite are mixed at a weight ratio of 2:8 was put into the uniformly mixed solution and stirred for 1 hour to prepare a negative electrode active material slurry 4 where the powder is uniformly dispersed. A small amount of NMP was added to adjust viscosity of the negative electrode active material slurry 4.

A coin cell was prepared in the same manner as in Example 1, except that a negative electrode was prepared by using the negative electrode active material slurry 4.

Comparative Example 1

A coin cell was prepared in the same manner as in Example 1, except that a 5% solution was prepared by dissolving PVA (saponification: about 87 to about 89%, average Mw: about 31,000 to about 50,000 g/mol) that is vacuum-dried for 24 hours at 110° C. in pure water, instead of the aqueous binder composition (solution E) prepared in Preparation Example 2, the material A (carboxyl group introduced to CNT) prepared in (1) of Preparation Example 1 was mixed in an amount of 10 wt % compared to PVA, and then the material A was uniformly dispersed in the 5% solution by using an ultrasound device.

Comparative Example 2

A coin cell was prepared in the same manner as in Example 2, except that a 5% solution was prepared by dissolving PI that is vacuum-dried for 24 hours at 110° C. in NMP, instead of the organic binder composition (solution H) prepared in Preparation Example 4, the material A (carboxyl group introduced to CNT) prepared in (1) of Preparation Example 1 was mixed in an amount of 10 wt % compared to PI, and then the material A was uniformly disposed in the 5% solution by using an ultrasonic device.

Comparative Example 3

A coin cell was prepared in the same manner as in Example 3, except that 5% solutions were prepared by respectively dissolving PI and urethane modified epoxy resin in NMP, instead of the organic binder compositions (solutions H and J) prepared in Preparation Examples 4 and 5, the material A (carboxyl group introduced to CNT) prepared in (1) of Preparation Example 1 was mixed in an amount of 10 wt % compared to PI and urethane modified epoxy resin, and then the material A was uniformly dispersed in the 5% solutions by using an ultrasonic device.

Evaluation Example 1

Evaluation of Battery Characteristics

Initial formation efficiencies and lifetimes of the lithium batteries manufactured in Examples 1 through 4 and Comparative Examples 1 through 3 were evaluated as follows.

Charging and discharging experiments were performed at a room temperature of 25° C., the initial formation efficiencies were evaluated at 0.05 C charge/0.05 C discharge, and the lifetimes were evaluated by repeating 0.5 C charge/0.5 C discharge 100 and 300 times. The initial formation efficiency is calculated according to Equation 1 below, and the lifetime is calculated as a capacity retention ratio defined by Equation 2 below.

Initial Formation Efficiency [%]=[Discharge Capacity in First Cycle/Charge Capacity in First Cycle]× 100   Equation 1

Capacity Retention Rate [%]=Discharge Capacity in 100th (or 300th) Cycle/Charge Capacity in First Cycle   Equation 2

Results of evaluating the initial formation efficiency and lifetime of the lithium batteries are shown in Table 1 below.

TABLE 1

|  | Initial Formation Efficiency | Lifetime (@100 cycle) | Lifetime (@300 cycle) |
| --- | --- | --- | --- |
| Example 1 | 95% | 65% | 35% |
| Comparative Example 1 | 95% | 55% | — |
| Example 2 | 92% | 81% | 63% |
| Example 3 | 90% | 85% | 72% |
| Comparative Example 2 | 89% | 72% | 33% |
| Example 4 | 92% | 78% | 57% |
| Comparative Example 3 | 92% | 61% | 25% |

As shown in Table 1 above, the initial formation efficiencies are similar in the lithium batteries of Examples 1 through 4 and Comparative Examples 1 through 3, but the lifetimes are remarkably different at 100 and 300 cycles, specifically at 300 cycles. The lithium batteries (CNT chemically bonded to a binder is used) of Examples 1 through 4 have twice higher lifetimes than the lithium batteries (CNT and a binder are simply mixed) of Comparative Examples 1 through 3. The lifetimes of the lithium batteries of Examples 1 through 4 are improved since the CNT does not agglomerate during movement even when an active material expands and contacts due to charging and discharging, and a conducting path is maintained as tensile strength of the binder is increased due to the CNT.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A binder for an electrode of a lithium battery, wherein the binder comprises:
   a carbon nanotube; and
   a polymer bonded to the carbon nanotube by a chemical bond,
   wherein the chemical bond is an ionic bond, and
   wherein the ionic bond comprises a carboxylate ion and an ammonium ion.

2. The binder of claim 1, wherein the carbon nanotube is a single walled carbon nanotube, a double-walled carbon nanotube, a multi-walled carbon nanotube, a bunch type carbon nanotube, or a mixture thereof.

3. The binder of claim 1, wherein the carbon nanotube has a diameter of from about 5 to about 50 nm and a length of from about 10 to about 50 µm.

4. The binder of claim 1, wherein the amount of the carbon nanotube is from about 1 to about 30 parts by weight based on 100 parts by weight of the polymer.

5. The binder of claim 1, wherein the polymer comprises at least one selected from the group consisting of polyamic acid, polyvinyl alcohol (PVA), carboxy methyl cellulose (CMC), starch, hydroxypropyl cellulose, regenerated cellulose, phenol-resin, epoxy resin, polyimide (PI), polyamide imide (PAI), polyacrylic acid, polymethacrylic acid, copolymers thereof, modified resins thereof, and condensation polymers thereof.

6. A lithium battery comprising:
  a negative electrode comprising a negative electrode active material;
  a positive electrode comprising a positive electrode active material facing the negative electrode; and
  an electrolyte disposed between the negative electrode and the positive electrode, wherein at least one of the negative electrode and the positive electrode comprises a binder comprising:
  a carbon nanotube; and
  a polymer bonded to the carbon nanotube by a chemical bond,
  wherein the chemical bond is an ionic bond, and
  wherein the ionic bond comprises a carboxylate ion and an ammonium ion.

7. The lithium battery of claim 6, wherein the amount of binder is about 1 to about 20 parts by weight, based on 100 parts by weight of the negative electrode active material or the positive electrode active material.

8. The lithium battery of claim 6, wherein the polymer comprises at least one selected from the group consisting of polyamic acid, polyvinyl alcohol (PVA), carboxy methyl cellulose (CMC), starch, hydroxypropyl cellulose, regenerated cellulose, phenol-resin, epoxy resin, polyimide (PI), polyamide imide (PAI), polyacrylic acid, polymethacrylic acid, copolymers thereof, modified resins thereof, and condensation polymers thereof.

9. A method of making a binder comprising a carbon nanotube and a polymer bonded to the carbon nanotube by a chemical bond for a secondary lithium battery, the method comprising:
  adding a carbon nanotube having a functional group to a polymer or a polymerizable material to form a mixture,
  stirring and heating the mixture to form the binder,
  wherein the chemical bond is an ionic bond, and
  wherein the ionic bond comprises a carboxylate ion and an ammonium ion.

10. The method of claim 9, wherein the functional group is a carboxyl group, a hydroxyl group, an acyl chloride group or an amine group.

11. The method of claim 9, wherein the functional group of the carbon nanotube is a carboxyl group which is modified to an acyl chloride group or an amine group before adding the carbon nanotube to the polymer or the polymerizable material.

12. The method of claim 9, further comprising the step of introducing the functional group on the carbon nanotube by at least one of wet etching with strong acid and dry etching using plasma or vacuum ultraviolet rays.

13. The method of claim 9, wherein the polymer comprises at least one selected from the group consisting of polyamic acid, polyvinyl alcohol (PVA), carboxy methyl cellulose (CMC), starch, hydroxypropyl cellulose, regenerated cellulose, phenol-resin, epoxy resin, polyimide (PI), polyamide imide (PAI), polyacrylic acid, polymethacrylic acid, copolymers thereof, modified resins thereof, and condensation polymers thereof.

14. The method of claim 9, further comprising adding at least one catalyst selected from the group consisting of triethyl amine and p-toluene sulfonic acid to the mixture.

* * * * *